Patented Oct. 8, 1946

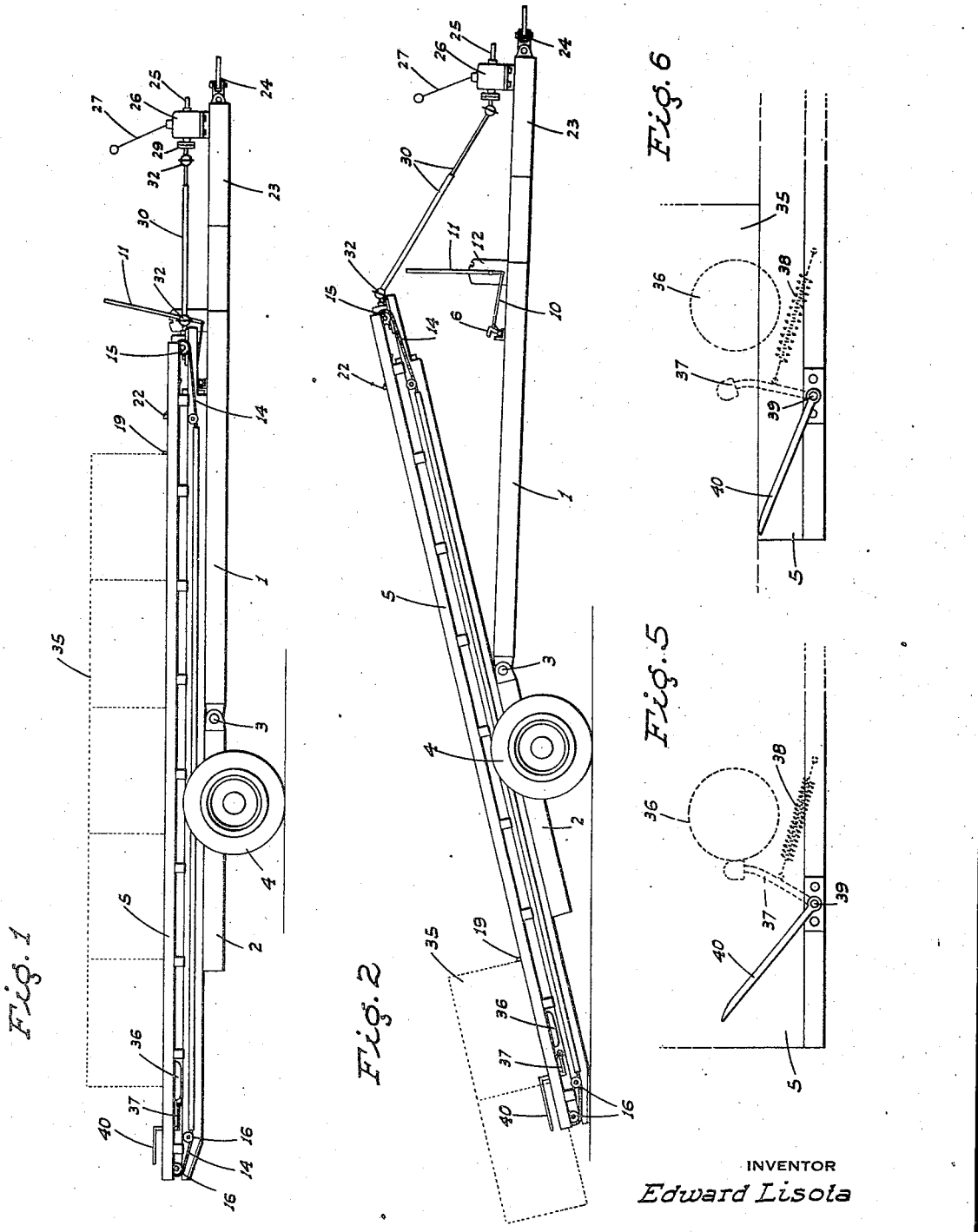

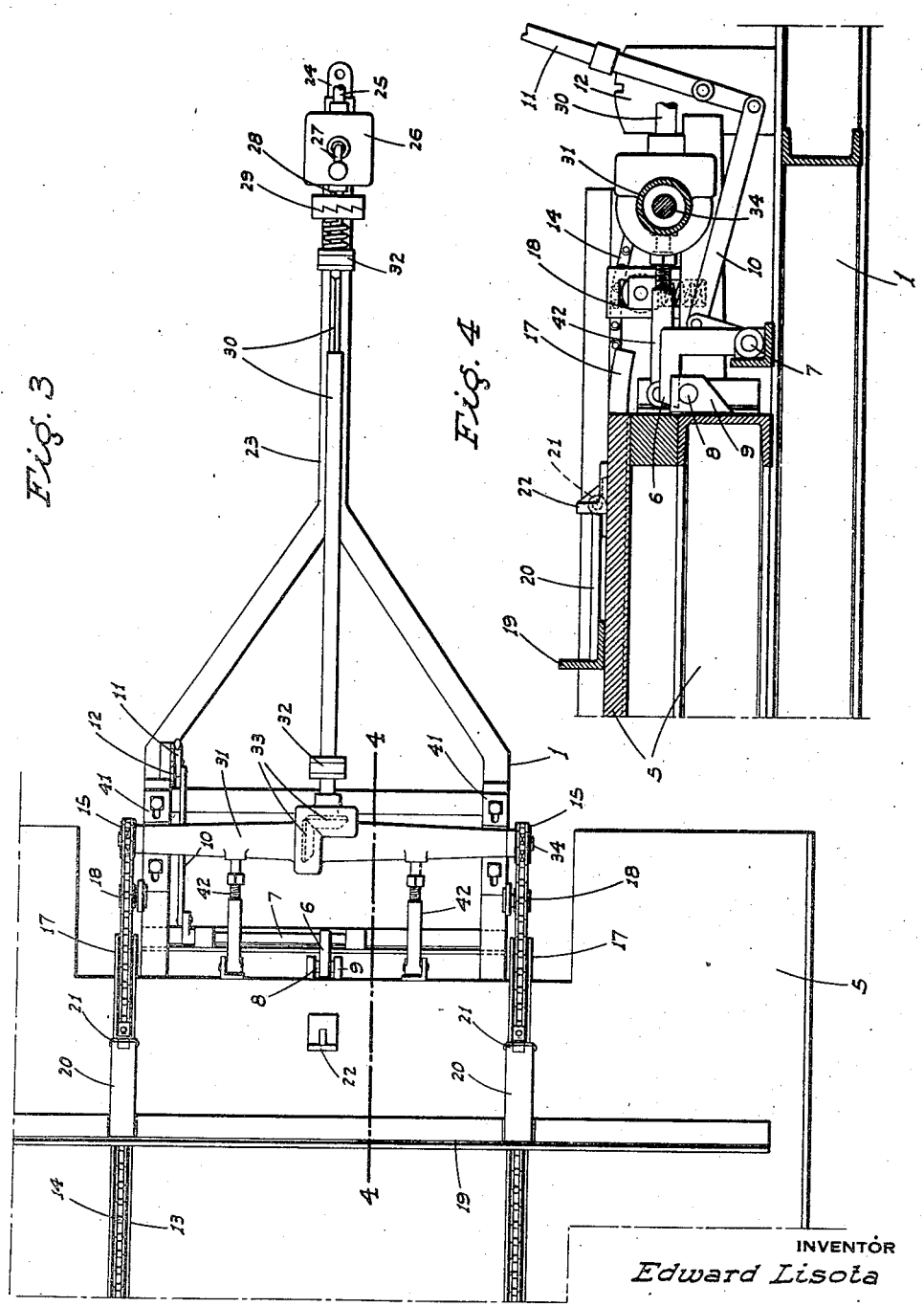

2,408,862

UNITED STATES PATENT OFFICE 2,408,862

VEHICLE BED UNLOADING DEVICE

Edward Lisota, Patterson, Calif.

Application June 25, 1945, Serial No. 601,411

1 Claim. (Cl. 214—85)

This invention relates in general to load hauling vehicles, and in particular the invention features a novel device for power unloading the bed of such a vehicle. In the present embodiment the invention is shown in combination with a low-bed load hauling trailer adapted to transport and unload material such as baled hay. It is expressly understood, however, that while the present embodiment is designed for agricultural use, the invention may be adapted to many other uses.

An additional feature of the invention is the provision in a power actuated, vehicle bed unloading device, as above, of a driven, load engaging pusher bar supported transversely on top of the bed and movable longitudinally thereof whereby to abut against and push the load from said bed.

The invention also provides a unique driving mechanism for the pusher bar; said mechanism including a pair of transversely spaced endless flexible members (here in the form of chains) mounted with the upper runs thereof riding in longitudinal channels in the bed, the pusher bar extending between and being attached to said endless flexible members for movement therewith.

A further feature of the invention is a tiltable mount for the bed of the vehicle whereby said bed may be disposed at an incline with one end in ground contact; the power driven pusher bar being arranged to move toward the lower end of the inclined bed whereby the load is pushed from said bed onto the ground.

A further object of the invention is to produce a simple and inexpensive device and yet one which will be exceedingly effective for the purpose for which it is designed.

These objects are accomplished by means of such structure and relative arrangement of parts as will fully appear by a perusal of the following specification and claim.

In the drawings similar characters of reference indicate corresponding parts in the several views:

Figure 1 is a side elevation of a low bed trailer embodying the present invention; the bed being shown in horizontal transport position.

Figure 2 is a similar view, but shows the bed rearwardly inclined into ground engagement and for discharge of the load by the power driven unloading device.

Figure 3 is an enlarged fragmentary plan view of the driving mechanism for the pusher bar.

Figure 4 is a cross section on line 4—4 of Fig. 3.

Figure 5 is a fragmentary plan view of the signal bell unit in normal position.

Figure 6 is a fragmentary plan view of the signal bell unit as engaged by the load, with the striker retracted from the bell.

Referring now more particularly to the characters of reference on the drawings, the invention is here shown embodied in a low bed trailer, which includes a longitudinally extending main frame 1 having a rear section 2; said rear section being articulated relative to the main frame, as at 3, and for downward swinging movement from a normal substantially horizontal position, as shown in Fig. 1, to a rearwardly inclined position, as shown in Fig. 2. The rear section 2 of the main frame 1 is supported by transversely spaced rear wheels 4, about the axis of which said rear section 2 pivots when it is moved to said rearwardly inclined position.

The main frame supports a relatively wide, longitudinally elongated bed 5 of rigid construction, said bed extending, from a point short of the forward end of the main frame, rearwardly to a termination some distance back of the rear section 2. The bed 5 is fixed only to the rear section 2, whereby said bed can tilt from the normal horizontal position of Fig. 1 to a rearwardly inclined position into ground engagement, as shown in Fig. 2. When the bed is in its normal horizontal position, it is of course supported by the main frame 1 ahead of the articulation point 3.

The bed 5 is normally secured against tilting movement from its normal horizontal position by means of a latch unit which includes an upstanding L-shaped latch 6 carried on a cross shaft 7 on the main frame 1; such latch engaging over a latch pin 8 fixed transversely between spaced ears 9 on the forward end of the bed 5. The latch 6 is adapted to be released from the latch pin 8 by means of a lever and linkage assembly, indicated generally at 10, which assembly includes an upstanding hand lever 11. The lever 11 is normally but releasably secured by suitable means with a notched, upstanding holding plate 12. When the lever 11 is released and swung rearwardly, the latch 6 is retracted from the pin 8 so that the bed 5 may swing to the rearwardly tilted, ground engaging position of Fig. 2.

The bed 5 is formed, on top, with a pair of transversely spaced, longitudinally extending channels 13 which are disposed in parallel relation to each other. Endless chains 14, corresponding to channels 13, surround the bed 5 from end to end thereof, with the upper runs of said chains seating in said channels for travel in the latter. The channels 13 are of a depth so that the chains 14 do not project thereabove. Adjacent the forward end of the bed 5 the chains 14 run about drive sprockets 15, while adjacent the rear end of the bed the chains run about idler rollers 16. In order to assure proper delivery of the upper runs of the chains 14 into the channels 13, the latter are extended with a somewhat downward curve, as at 17, and said upper runs pass over spring urged tensioning rollers 18 in advance of the channel extensions 17. The lower runs of the chains are suitably housed, as shown, in order to support and protect the same.

A transversely extending pusher bar 19 rides atop the bed 5 in intersecting relation to the upper runs of the chains 14, and to which upper runs said pusher bar is permanently secured by forwardly projecting arms 20 corresponding and hinged to the chains as at 21. An upstanding stop 22 on the forward end of the bed limits advance of said pusher bar.

The chains 14 are selectively and reversibly driven in the following manner:

The main frame 1 is provided, at its forward end, with a tongue 23 having a hitch 24 adapted to connect the trailer with a tractor having a rear power take-off shaft (not shown). The rear power take-off shaft of the tractor is connected by a universal shaft assembly, indicated in part at 25, with a reversing gear box 26 mounted on the tongue 23. The reversing gear box 26 includes a shifting lever 27. The output shaft 28 of the reversing gear box 26 leads into a spring-urged safety clutch unit 29 adapted, as will be evident, to release when the bar 19 engages the stop 22 if this occurs before the operator shuts off the drive. The safety clutch unit 29 is coupled to the forward end of a splined drive shaft unit 30 which projects rearwardly into a transversely extending housing 31; the drive shaft unit 30 having universal joints 32 interposed therein in spaced relation. Within the housing 31 the drive shaft unit 13 is coupled in driving relation, by a bevel gear arrangement 33, with a cross shaft 34 contained in protective relation in said housing. The driving sprockets 15 are fixed on the outer ends of said shaft 34.

With the above described driving mechanism the reversing gear box 26 is effective to transmit a selective and reversible drive through the splined drive shaft unit to the cross shaft 34 and thence to the chains 14, whereby the pusher bar 19 may be moved along the bed 5 rearwardly or forwardly.

When it is desired to unload material from the bed 5, as for example a load of baled hay, indicated diagrammatically at 35, the device is operated as follows:

The latch 6 is first retracted from the latch pin 8 and thereafter the pusher bar 19, which is disposed ahead of the load 35, is power actuated in a rearward direction into engagement with said load. As the pusher bar moves rearwardly, the load is correspondingly shifted on the bed 5 until the latter tilts rearwardly to the position shown in Fig. 2. With continued rearward movement of the pusher bar 19 the load 35 is effectively slid off of the bed 5 onto the ground. In this manner the load can be discharged quickly and readily, and without the necessity of any manual handling. After the entire load is discharged, the drive for the chains 14 is reversed and the pusher bar is returned to its starting position adjacent the forward end of the bed 5.

In order to signal the operator of the tractor when the load 35 has been entirely discharged from the bed 5, I provide the following simple arrangement:

A bell or gong 36 is mounted on the bed 5 beneath the same and adjacent its rear end, and a pivotally mounted striker 37 is supported in striking relation to said bell; the striker normally being urged toward the bell by a tension spring 38. The striker 37 is connected to a vertical shaft 39 which extends upwardly through the bed, and above the latter said shaft is fitted with a control arm 40 which projects inwardly and rearwardly, as shown. The control arm 40 is of such length that when the load 35 moves rearwardly on the bed 5, said load engages said control arm and swings it laterally outwardly, retracting the striker 37 from the bell 36. As long as the load is passing the arm 40 the striker remains in this position. However, when the last part of the load leaves the rear end of the bed 5 the control arm 40 escapes said part of the load, whereupon the spring 38 forcefully swings the striker 37 into contact with the bell 36, providing the desired signal for the operator to discontinue further rearward movement of the pusher bar 19.

It will be recognized, of course, that under certain circumstances it may be desired to unload the bed 5 without tilting the same, as for example unloading onto an elevated platform or the like. In this event the latch 6 is not released and the power actuated driving mechanism then functions to discharge the load 35 from the rear of said bed at a point some distance above ground.

Proper tension is maintained on the chains 14 by mounting the housing 31 on longitudinally adjustable blocks 41; the actual adjustment of the housing being accomplished through the medium of adjustment screws 42 connected between the housing 31 on opposite sides of the gears 33, and a forward portion of the bed 5.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent are desired:

In a vehicle, a longitudinally extending main frame including a front section and a rear section secured together in articulated relation whereby the rear section is rearwardly tiltable, a bed disposed above and supported by the main frame, said bed being fixed to the rear section for rearward tilting therewith, means normally but releasably maintaining the bed against tilting, a load engaging member extending above the bed for movement lengthwise thereof, and power actuated means connected to said member operative to move the same in opposite directions, selectively; said vehicle including transversely spaced supporting wheels journaled in connection with said rear frame section and about the axis of which wheels said rear section pivots upon tilting thereof.

EDWARD LISOTA.